US012643272B2

(12) United States Patent
Matsumura et al.

(10) Patent No.: US 12,643,272 B2
(45) Date of Patent: Jun. 2, 2026

(54) MANUFACTURING APPARATUS CONTROL METHOD, MANUFACTURING SYSTEM, CONTROL APPARATUS, AND MOLDED ARTICLE MANUFACTURING METHOD

(71) Applicant: CANON KABUSHIKI KAISHA, Tokyo (JP)

(72) Inventors: Junichi Matsumura, Shizuoka (JP); Kengo Nakajima, Kanagawa (JP); Akira Suzuki, Kanagawa (JP); Toshiki Kobayashi, Kanagawa (JP); Nobuharu Hoshi, Kanagawa (JP); Toshiteru Yamasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 200 days.

(21) Appl. No.: 18/520,220

(22) Filed: Nov. 27, 2023

(65) Prior Publication Data

US 2024/0173904 A1     May 30, 2024

(30) Foreign Application Priority Data

Nov. 28, 2022     (JP) ................................. 2022-189346

(51) Int. Cl.
    *B29C 45/80*      (2006.01)
    *B29C 45/54*      (2006.01)
    *B29C 45/76*      (2006.01)

(52) U.S. Cl.
    CPC ............. *B29C 45/54* (2013.01); *B29C 45/80* (2013.01); *B29C 2045/7606* (2013.01); *B29C 2945/76498* (2013.01); *B29C 2945/76678* (2013.01)

(58) Field of Classification Search
    CPC ....... B29C 45/53; B29C 45/531; B29C 45/54; B29C 45/80; B29C 2945/76678
    See application file for complete search history.

(56) References Cited

U.S. PATENT DOCUMENTS

| | | | |
|---|---|---|---|
| 2001/0005062 A1 | 6/2001 | Klaus et al. | |
| 2018/0345558 A1* | 12/2018 | Belzile | B29C 45/762 |
| 2022/0016818 A1 | 1/2022 | Kubo et al. | |
| 2024/0262022 A1* | 8/2024 | Yamawaki | B29C 45/80 |

FOREIGN PATENT DOCUMENTS

| | | | | |
|---|---|---|---|---|
| JP | H1110696 A | 1/1999 | | |
| JP | H11165332 A | 6/1999 | | |
| JP | 2006256278 A | 9/2006 | | |
| JP | 2009255452 A | 11/2009 | | |
| WO | WO-2006008164 A2 * | 1/2006 | ........... | B29C 45/544 |

OTHER PUBLICATIONS

Translation of WO-2006008164-A2 ("Weyand") (Year: 2006).*
Translation of JP 2009255452 A ("Taniguchi") (Year: 2009).*

* cited by examiner

*Primary Examiner* — John J DeRusso

(74) *Attorney, Agent, or Firm* — Canon U.S.A., Inc. IP Division

(57)        ABSTRACT

The manufacturing apparatus includes a nozzle, an injection cylinder, an injection plunger, a plunger pressing member, and a movable unit for moving the plunger pressing member. The movable unit has a ball screw including a moving member and a screw shaft, and the moving member is movable to a first position, a second position, and a third position along the screw shaft. A central processing unit (CPU) of a control apparatus controls the movable unit to move the moving member to the third position in a repetition of an injection operation in which the moving member is moved between the first position and the second position.

23 Claims, 10 Drawing Sheets

FIG.4

MANUFACTURING APPARATUS CONTROL METHOD, MANUFACTURING SYSTEM, CONTROL APPARATUS, AND MOLDED ARTICLE MANUFACTURING METHOD

BACKGROUND

Field of the Disclosure

The present disclosure relates to a manufacturing apparatus that uses molten resin and includes a ball screw, such as an injection molding machine.

Description of the Related Art

Manufacturing apparatuses that use injection molding to manufacture molded articles made of resin have been known. In this type of manufacturing apparatuses, a molten resin is injected into a cavity of a mold by using a screw, a plunger, or the like, the molten resin is cooled to be cured in the mold, the mold is opened after the curing, and a molded product is taken out from the mold. Molded products are mass-produced by repeating a series of operations from injection of a molten resin to ejection of a molded product. Examples of the manufacturing apparatuses using injection molding include a pre-plunger type apparatus and an in-line screw type injection molding apparatus.

Japanese Patent Application Laid-Open No. 2006-256278 discusses a piston driving apparatus including a cylinder that stores a plasticized synthetic resin material, a piston that is disposed in the cylinder to extrude the plasticized synthetic resin material from the cylinder, a ball screw mechanism that has a nut disposed on the piston and a screw shaft screwed to the nut, and an electric motor that rotationally drives the screw shaft.

In the ball screw mechanism, a ball is provided to a space between the screw shaft and the nut and the space is filled with grease. The grease circulates around the ball, and has a function of reducing surface damage (fretting wear) that occurs when reciprocating sliding between two objects in contact with each other (the ball and the screw shaft or the nut) is repeatedly performed.

In the piston driving apparatus discussed in Japanese Patent Application Laid-Open No. 2006-256278, if injection of resin is repeated with minute strokes, the ball screw mechanism may be damaged, which results in a failure of the injection operation.

SUMMARY

Some embodiments of the present disclosure are directed to providing a technique advantageous in reducing breakage of a ball screw even in a case where an injection operation is repeated with minute strokes in injection molding.

According to an aspect of the present disclosure, a control method of a manufacturing apparatus that includes an injection nozzle configured to inject resin, an injection cylinder configured to store resin to be supplied to the injection nozzle, an injection plunger configured to press the resin stored in the injection cylinder, and a movable unit configured to move the injection plunger, wherein the movable unit has a ball screw that includes a moving member and a screw shaft, the moving member being configured to move in a direction in which the injection plunger moves, the screw shaft being configured to rotate to move the moving member, the control method includes moving the moving member movable to at least a first position, a second position, and a third position in a direction along the screw shaft; and performing, by the moving of the moving member, a first injection operation, a second injection operation that is performed after the first injection operation, and a third injection operation that is performed after the second injection operation, wherein the first position is a position of the moving member when an amount of resin to be injected in the second injection operation is stored in the injection cylinder, wherein the second position is a position of the moving member when injection of the resin from the injection cylinder is completed in the second injection operation, wherein the third position is a position where a first distance from a position of a part of the moving member in the second position to the position of the part of the moving member in the third position is larger than a second distance from the position of the part of the moving member in the first position to the position of the part of the moving member in the second position, and wherein the moving member is moved to the third position in an interval between the first injection operation and the third injection operation.

Further features of various embodiments will become apparent from the following description of exemplary embodiments with reference to the attached drawings.

BRIEF DESCRIPTION OF THE DRAWINGS

FIG. 4 is a diagram illustrating the molded article manufacturing method using the injection apparatus according to the first exemplary embodiment.

DESCRIPTION OF THE EMBODIMENTS

Figure 1:
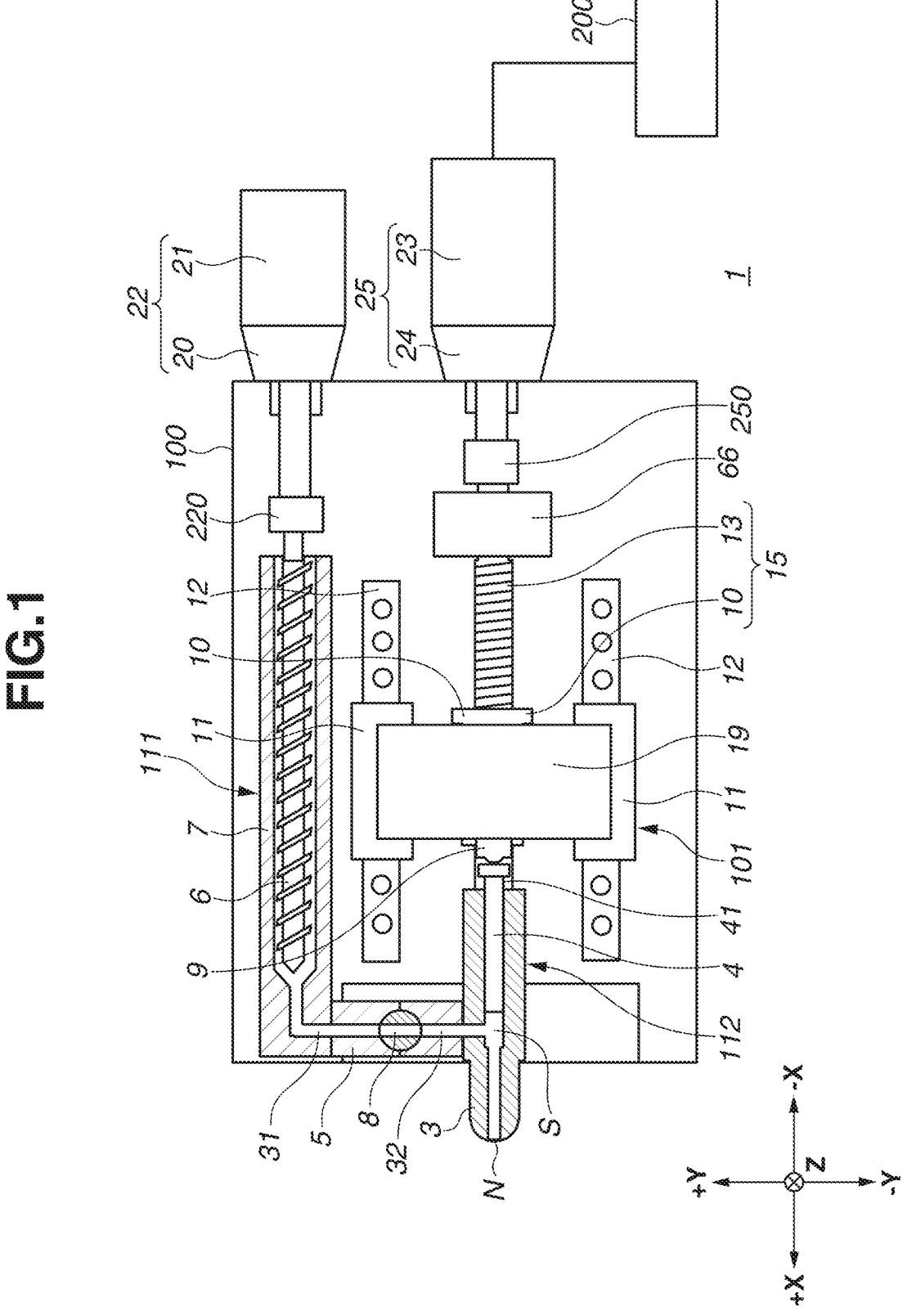
FIG. 1 is a schematic cross sectional view of an injection apparatus according to a first exemplary embodiment.

Hereinafter, exemplary embodiments will be described with reference to the drawings.

In the drawings referred to in the following description of the exemplary embodiments, elements denoted by the same reference numerals have the same functions unless otherwise specified.

FIG. 1 is a schematic cross sectional view of a manufacturing system 1 according to a first exemplary embodiment. The manufacturing system 1 includes a manufacturing apparatus 100 and a control apparatus 200. The manufacturing apparatus 100 is a pre-plunger type injection molding apparatus, which is used to manufacture resin molded articles, and includes a plasticizing unit 111, an injection unit 112, and a movable unit 101. The control apparatus 200 is an example of a control unit capable of controlling constituent components included in an injection plunger 4 and the movable unit 101 of the manufacturing apparatus 100. The control apparatus 200 includes one or a plurality of computers having a processor, for example.

[Description of Plasticizing Unit]

The plasticizing unit 111 plasticizes a resin material fed to the plasticizing unit 111 and supplies a molten resin to the injection unit 112 via a coupling member 5. The injection unit 112 injects the molten resin supplied from the plasticizing unit 111 into a mold (not illustrated) to supply the molten resin to the inside of the mold.

The plasticizing unit 111 includes a hopper (not illustrated), a plasticizing screw 6, a plasticizing cylinder 7, and a plasticizing drive unit 22. For example, a pellet form resin material is supplied to the hopper. The resin material is a thermoplastic resin. The plasticizing cylinder 7 is heated by a heater (not illustrated) to be adjusted to a temperature at which the supplied resin material is plasticized. A plasticizing screw 6 is disposed inside the plasticizing cylinder 7. The plasticizing screw 6 is a rotatable screw. The plasticizing screw 6 has a diameter of 17 millimeters (mm), for example.

The plasticizing drive unit 22 includes a reduction gear 20 and a plasticizing motor 21, which is an example of a drive source, and is configured to rotationally drive the plasticizing screw 6 via a coupling 220. The plasticizing motor 21 is controlled by the control apparatus 200. The plasticizing screw 6 plasticizes and melts the resin material supplied to a gap between the plasticizing screw 6 and the plasticizing cylinder 7, and moves the resin material to a leading end of the plasticizing screw 6.

[Description of Injection Unit]

The injection unit 112 includes an injection cylinder 3, the injection plunger 4, the coupling member 5, a check valve 8, and the movable unit 101. The material of the injection cylinder 3 and the injection plunger 4 may be a metal, for example high-speed steel or cemented carbide.

The injection cylinder 3 has a supply port S to which the molten resin is supplied and a nozzle N from which the molten resin is ejected. The nozzle N is an example of an injection port and is a leading end of the injection cylinder 3 in the axial direction. Bringing the nozzle N into contact with a mold (not illustrated) causes the inside of the injection cylinder 3 and the inside of the mold to communicate with each other.

The plasticizing cylinder 7 and the injection cylinder 3 are connected through the coupling member 5. The coupling member 5 has the check valve 8 serving as a valve that is connected to the supply port S in such a manner that the molten resin does not flow backward from the supply port S to the outside of the injection cylinder 3 (that is, not flow to the plasticizing unit 111). The check valve 8 prevents the molten resin from flowing out of the injection cylinder 3 through the supply port S.

The check valve 8 is connected to the supply port S in an orientation in which the molten resin does not flow backward from the injection cylinder 3 to the plasticizing screw 6. With the check valve 8 disposed to be connected to the supply port S, the molten resin flows in a flow path 31 and a flow path 32 in a forward direction from the plasticizing cylinder 7 to the injection cylinder 3, whereby the molten resin does not flow in a reverse direction from the injection cylinder 3 to the plasticizing cylinder 7. The flow path 31 and the flow path 32 are flow paths through which the molten resin flows. The resin plasticized and melted by the plasticizing screw 6 is supplied into the injection cylinder 3 through the check valve 8 and the supply port S of the injection cylinder 3. The molten resin supplied from the plasticizing screw 6 is stored in the inside of the injection cylinder 3. The supply port S may be provided with an on-off valve instead of the check valve 8.

The plasticized and melted resin flows from the plasticizing cylinder 7 into the injection cylinder 3 through the flow paths 31 and 32 in the coupling member 5 and is stored in the injection cylinder 3.

Inside the injection cylinder 3, a switching valve (not illustrated) is disposed in a vicinity of the nozzle N. The switching valve changes its position between a position (open position) at which the molten resin is injected from the nozzle N and a position (closed position) at which injection of the molten resin from the nozzle N is blocked. The switching valve is a valve that prevents the molten resin from flowing out from the nozzle N (injection port) to the outside of the injection cylinder 3. The switching valve is controlled by the control apparatus 200. The check valve 8 may be disposed outside the injection cylinder 3 or inside the mold. Also, the check valve 8 disposed outside the injection cylinder 3 and the check valve 8 disposed inside the mold may be used in combination.

As an example of a case in which the check valve 8 is disposed outside the injection cylinder 3, a shut-off nozzle unit can be used, and as an example of a case in which the check valve 8 is disposed inside the mold, a hot runner unit can be used.

[Description of Movable Unit]

Figure 2:
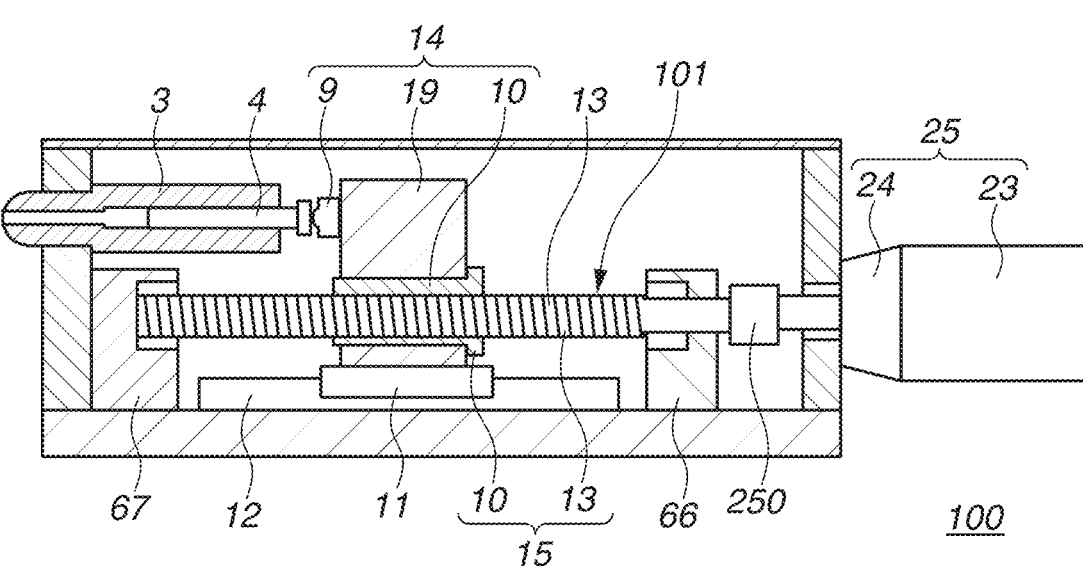
FIG. 2 is a diagram illustrating a molded article manufacturing method using the injection apparatus according to the first exemplary embodiment.

FIG. 2 is a schematic cross sectional view of the injection unit 112 in the present exemplary embodiment as viewed from a minus (−) Y direction of FIG. 1. The movable unit 101 has a ball screw 15. An injecting drive unit 25 includes a reduction gear 24 and an injection motor 23, which is an example of a drive source, and is configured to rotationally drive the screw shaft 13 via a coupling 250. The ball screw 15 includes a moving member 14 (e.g., a ball screw nut 10) and a screw shaft 13. The screw shaft 13 is rotated to move the moving member 14. The injection motor 23 is, for example, a rotary motor, and is controlled by the control apparatus 200. A front side of the screw shaft 13 is held by a front side block 67 including a bearing, and a back side of the screw shaft 13 is held by a back side block 66 including a bearing.

The moving member 14 includes a ball screw nut 10, an injection driving member 19 also called as a moving block, and a plunger pressing member 9. The ball screw nut 10 is connected and fixed to the injection driving member 19, and the injection driving member 19 is connected and fixed to the plunger pressing member 9. The injection driving member 19 is also connected to a linear guide block 11 illustrated in FIG. 1, and the linear guide block 11 moves while sliding on linear guide rails 12. With this configuration, the plunger pressing member 9 is able to be moved forward and backward by rotation of the injection motor 23. At least two of the plunger pressing member 9, the ball screw nut 10, the injection driving member 19 and the linear guide block 11 that move together may be integrated into a single member as the moving member 14.

The plunger pressing member 9 is formed separately from the injection plunger 4, and is a member independent of the injection plunger 4. That is, the plunger pressing member 9 is able to be brought into contact with and separated from the injection plunger 4.

The plunger pressing member 9 has a spherical surface on an end 9a (shown in FIG. 3), which is a side that comes into contact with the injection plunger 4, and the radius of the spherical surface is R50 in the present exemplary embodiment. Meanwhile, an outer peripheral surface of the injection plunger 4 and an inner peripheral surface of the injection cylinder 3 form a sliding fitting portion, and a fitting clearance of 2 micrometers (μm) to 50 μm is provided between them in order to prevent leakage of the molten resin and galling between the injection plunger 4 and the injection cylinder 3. In the present exemplary embodiment, a plunger having a diameter of 6 mm is used as the injection plunger 4.

DESCRIPTION OF OPERATION

Hereinafter, the moving direction of the injection cylinder 3 is referred to as an X direction. A Y direction is a direction orthogonal to the X direction, and a Z direction is a direction orthogonal to the X direction and the Y direction. A plus (+) X direction is a forward direction, and the −X direction is a backward direction.

The plunger pressing member 9 is brought into contact with and separated from the injection plunger 4 by being driven by the injection motor 23 to move in the X direction. That is, the plunger pressing member 9 is driven by the injection motor 23 to move in the +X direction, whereby the plunger pressing member 9 presses the injection plunger 4 in the +X direction to move the injection plunger 4 in contact with the plunger pressing member 9 in the +X direction. Further, the plunger pressing member 9 is separated from the injection plunger 4 by being driven by the injection motor 23 to move in the −X direction. That is, the +X direction is a direction in which the plunger pressing member 9 presses the injection plunger 4, and the −X direction is a direction in which the plunger pressing member 9 is separated from the injection plunger 4.

Movement of the injection plunger 4 in the −X direction beyond the plunger pressing member 9 is restricted by the plunger pressing member 9 being in contact with the injection plunger 4. Movement of the injection plunger 4 in the +X direction beyond a contact surface of the injection cylinder 3 is restricted by a step portion 41 being in contact with the injection cylinder 3.

The injection plunger 4 is moved backward by the molten resin flowing into the injection cylinder 3. An operation by the movable unit 101 to move the plunger pressing member 9 to an appropriate position in the −X direction allows the amount of the resin that is able to be stored in the injection cylinder 3 to be set, whereby metering of the molten resin is able to be performed.

Figure 3:
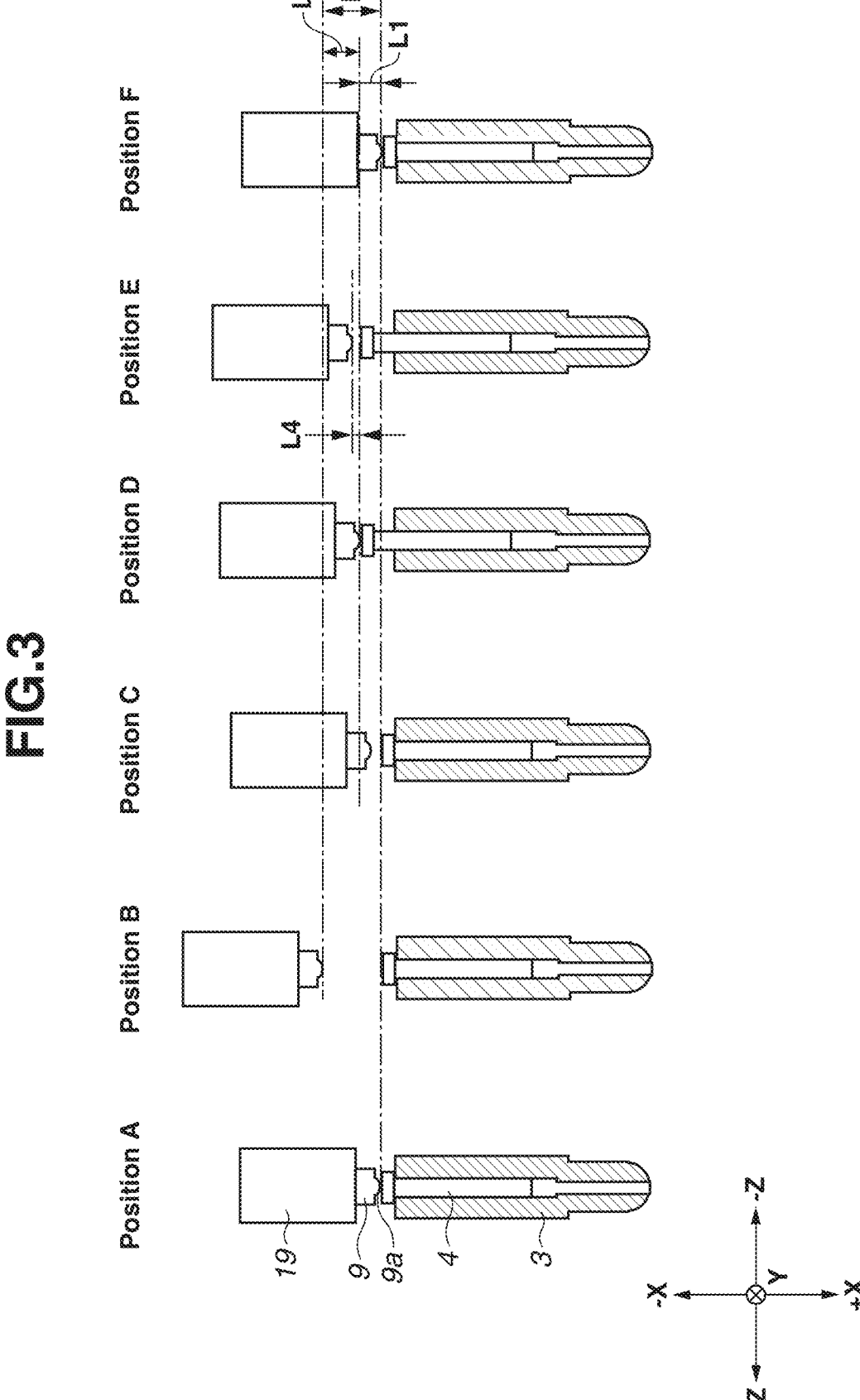
FIG. 3 includes diagrams illustrating the molded article manufacturing method using the injection apparatus according to the first exemplary embodiment.

Next, a positional relationship among the injection cylinder 3, the injection plunger 4, and the moving member 14 in manufacturing of a molded article using the manufacturing apparatus 100 according to the first exemplary embodiment will be described. FIG. 3 shows schematic cross sectional views of the injection cylinder 3, the injection plunger 4, the plunger pressing member 9, and the injection driving member 19 in the present exemplary embodiment, as viewed from the −Y direction of FIG. 1.

[Description of Injection Operation]

In FIG. 3, Position A is a diagram illustrating a position (injection completion position) at which injection of the molten resin stored in the injection cylinder 3 has been completed by the forward movement of the injection plunger 4 pressed via the plunger pressing member 9 with rotation of the injection motor 23. In this state, the plunger pressing member 9 and the injection plunger 4 are in contact with each other. Here, the position of the end 9a, which is a part of the moving member 14, of the plunger pressing member 9 in Position A is referred to as a "second position". An operation in which the injection plunger 4 injects the molten resin stored in the injection cylinder 3 is referred to as an "injection operation". During a repetition of the injection operation, a certain injection operation is referred to as a "first injection operation", an injection operation that is performed after the first injection operation is referred to as a "second injection operation", and an injection operation that is performed after the second injection operation is referred to as a "third injection operation".

In the present exemplary embodiment, description is given using an example case of elastomer molding which does not require a holding pressure process, and the injection completion position is set within 5 mm with respect to a forward limit position, which is a limit of a forward stroke (for example, 70 mm) of the injection plunger 4. The injection completion position may be a position at which a pressure control has been completed, or a position which has been stored as the injection completion position based on feedback to a control unit of the injection molding machine about a position where the pressure control for each shot has been completed.

In elastomer molding, a resin residual pressure in the injection cylinder 3 after completion of metering is small, and even if the plunger pressing member 9 retreats, the injection plunger 4 remains at the injection completion position. That is, in a case where the position at which the pressure control has been completed is used as the injection completion position, the control is to be performed with a pressure with which only the plunger pressing member 9 retreats, and the injection plunger 4 is able to remain at the injection completion position.

Position B is a diagram illustrating a "retreat completion position," which is a position where the plunger pressing member 9 has retreated in the −X direction by the moving member 14. In this state, the plunger pressing member 9 and the injection plunger 4 are separated from each other, and only the plunger pressing member 9 is moved by a stroke L3 in the −X direction. The position of the end 9a of the plunger pressing member 9 in Position B is referred to as a "third position", and an operation of moving the moving member 14 to the third position is referred to as a "fretting operation".

When the plunger pressing member 9 moves forward by a stroke corresponding to a product of a lead and the number of turns of the ball screw, a ball in a screw groove of the ball screw rotates once. The lead is a distance that is traveled by, when one of the screw shaft and the nut rotates once, the other in the axial direction.

The number of turns is a value indicating the number of times of rotation made by the ball (not illustrated) in the screw groove to return to its original position. In the case of a ball screw having the lead of 5 mm and three turns, the stroke L3 is 15 mm (5 mm*3).

Since the distance is set such that the plunger pressing member 9 moves the stroke L3 including a stroke L1 necessary for injection, a stroke L2 which is a movement amount in the fretting operation is able to be derived by L3–L1. More specifically, since the stroke L1 necessary for injection is 5 mm and the stroke L3 is 15 mm, the stroke L2, which is the movement amount in the fretting operation, is 10 mm (15 mm-5 mm).

[Description of Metering Operation]

Position C is a diagram illustrating a "metering start position," which is a position in a state immediately before the molten resin flows into the injection cylinder 3. In this state, the injection plunger 4 and the plunger pressing member 9 are separated from each other.

Position D is a diagram illustrating a "metering completion position," which is a position in a state in which the molten resin of an amount to be injected has been stored in the injection cylinder 3 and metering has been completed. In this state, the injection plunger 4 and the plunger pressing member 9 are in contact with each other. The position of the end 9a of the plunger pressing member 9 in the metering completion position is referred to as a "first position", and the operations from Position C to Position D in the first exemplary embodiment are referred to as a "metering operation".

The plunger pressing member 9 in the metering start position is at a position forward in the +X direction from the position where the plunger pressing member 9 is in the metering completion position. The position of the end 9a of the plunger pressing member 9 in the metering start position is referred to as a "fifth position".

In the metering operation, the plunger pressing member 9 presses the injection plunger 4 in the +X direction, and the molten resin flows into the injection cylinder 3 in a state in which a predetermined back pressure is applied to the molten resin. In this operation, the control apparatus 200 operates the movable unit 101 for moving the plunger pressing member 9 in such a manner that the pressure inside the injection cylinder 3 is maintained at a constant pressure (for example, a back pressure of 1 megapascal (MPa)). More specifically, the control apparatus 200 rotates the plasticizing screw 6 to move the injection plunger 4 backward in the –X direction while the pressure of the molten resin flowing into the injection cylinder 3 and the back pressure are balanced. After the injection plunger 4 has reached a predetermined metering position, the rotation of the plasticizing screw 6 is stopped, and the metering operation ends.

In the metering operation, the end 9a of the plunger pressing member 9 retreats to the metering completion position, which is at a distance of the stroke L1 from the injection completion position. The stroke L1 is 5 mm, for example.

Figure 4:
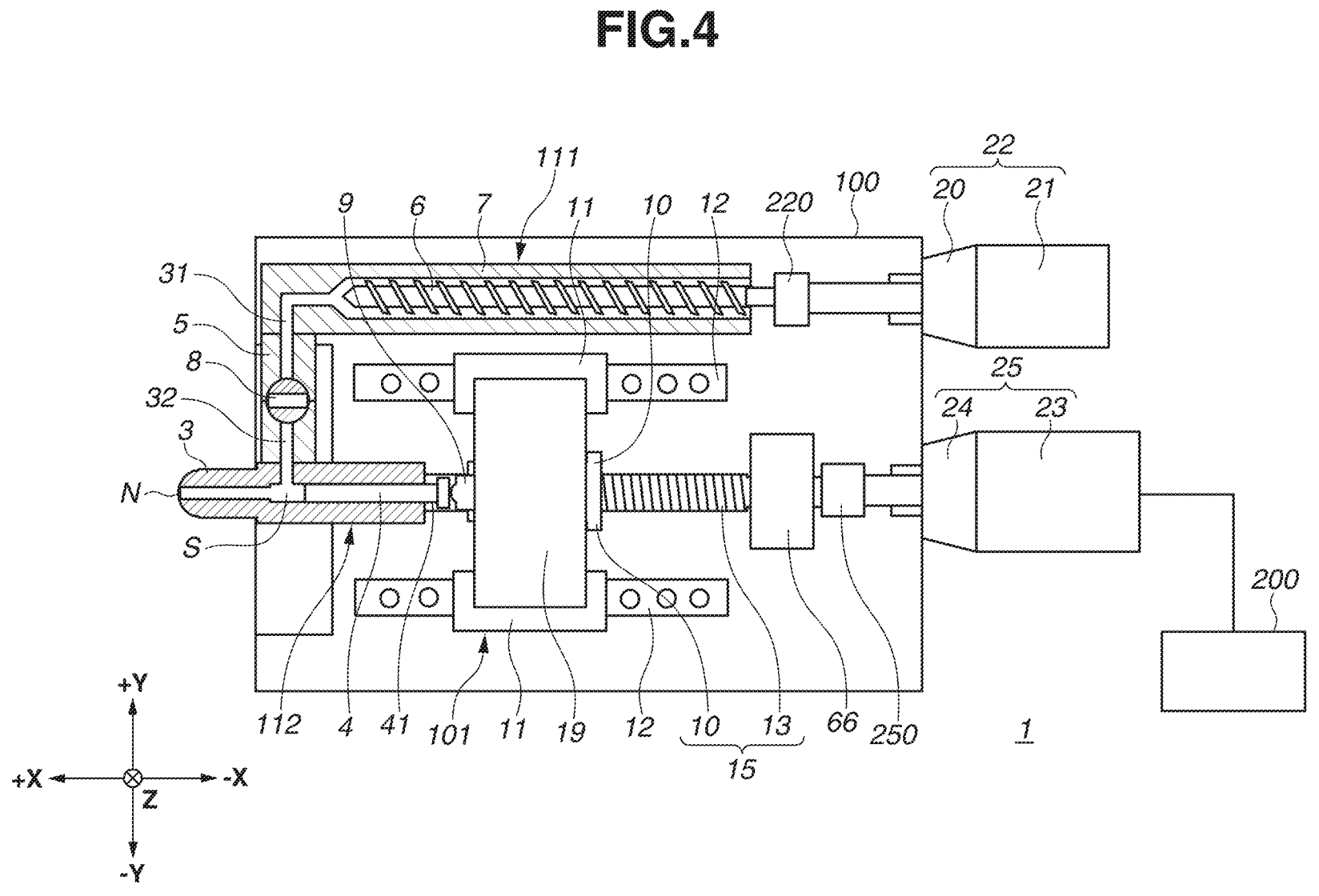

As shown in FIG. 4, after completion of the metering in the metering operation, the check valve 8 is closed to close the connection between the flow paths 31 and 32.

Here, the stroke L2 from the second position to the third position is referred to as a "first distance", and the stroke L1 from the first position to the second position is referred to as a "second distance".

[Description of Suck Back Operation]

Position E in FIG. 3 is a diagram illustrating a position where a "suck back operation" has been performed. The suck back operation is an operation of the plunger pressing member 9 further retreating by a predetermined amount in the –X direction opposite to the nozzle N after the metering operation has been completed and the connection between the flow paths 31 and 32 have been closed. The position of the plunger pressing member 9 retreated in the suck back operation is referred to as a suck back position. In this state, the injection plunger 4 and the plunger pressing member 9 may be separated from each other or may be in contact with each other. The suck back operation is an operation to move the injection plunger 4 backward for the purpose of reducing a resin internal pressure inside the injection cylinder 3 after completion of the metering operation.

In the metering operation, an internal pressure is applied to the molten resin stored in the injection cylinder 3. Thus, if the pressure of the molten resin inside the injection cylinder 3 remains high, leakage (dripping) of the molten resin from an injection nozzle tip or rapid ejection (jetting) of the molten resin from the injection nozzle tip in an injection operation occur. The suck back operation leads to reduction in leakage and ejection of the molten resin.

The position of the end 9a of the plunger pressing member 9 in the suck back position is referred to as a "fourth position". In the suck back operation, the end 9a of the plunger pressing member 9 retreats from the metering completion position to the suck back position where the plunger pressing member 9 has moved by a stroke L4. The stroke L4 from the metering completion position to the suck back position is referred to as a "third distance". The stroke LA is set to 2 mm to 3 mm, for example.

As in the above described configuration, the injection plunger 4 and the plunger pressing member 9 are configured to be separable from each other, whereby molding defects, such as voids and silver streaks, due to entrainment of air into the molten resin in the injection cylinder 3 during the metering operation and the suck back operation are reduced.

[Next Injection Operation]

Position F in FIG. 3 is a diagram illustrating the injection completion position in which the injection plunger 4 has been pressed by the plunger pressing member 9 and moved forward in the +X direction from the state illustrated in Position E, and injection of the molten resin stored in the injection cylinder 3 has been completed. In this state, the plunger pressing member 9 and the injection plunger 4 are in contact with each other.

With the above described configuration, in the molded article manufacturing process, the plunger pressing member 9 is able to be moved by a stroke more than or equal to a stroke in which grease can be circulated, and a continuous forming process with minute strokes can be performed without stopping the apparatus while wear and breakage of the ball screw portion are prevented.

Figure 5:
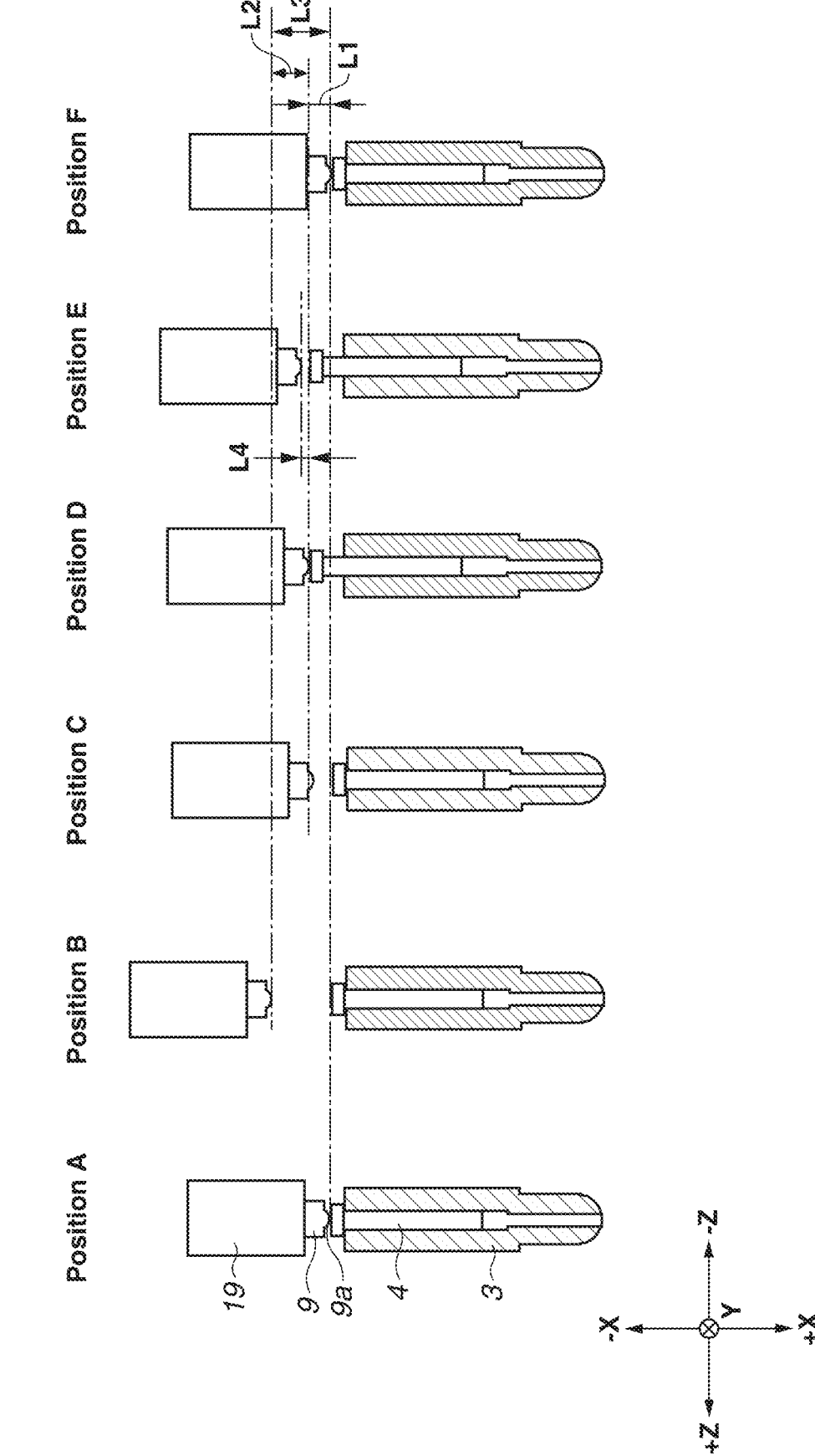
FIG. 5 includes diagrams illustrating a molded article manufacturing method using an injection apparatus according to a second exemplary embodiment.

An injection apparatus according to a second exemplary embodiment will be described with reference to FIG. 5. In the present exemplary embodiment, descriptions of the same matters as those in the first exemplary embodiment will be simplified or omitted. In FIG. 5, Positions A to F are diagrams illustrating a method of manufacturing a molded article using a manufacturing apparatus 100 according to the present exemplary embodiment, and Positions A to F schematically illustrate cross sections of the injection cylinder 3, the injection plunger 4, and the plunger pressing member 9 in the present exemplary embodiment in time series. In Positions A to F, the positional relationship between the injection plunger 4 and the plunger pressing member 9 with respect to the injection cylinder 3 is illustrated in time series, and movements from Positions A to F are repeated in the forming process.

Position A in FIG. 5 is a diagram illustrating a position where the injection plunger 4 has moved forward in the +X direction and injection of the molten resin stored in the injection cylinder 3 has been completed. The position of the end 9a of the plunger pressing member 9 in Position A is referred to as a "second position".

The metering completion position and the injection completion position are set by a user inputting numerical values to an operation screen. The control apparatus 200 calculates the stroke L1 from the metering completion position and the injection completion position set by the user, and performs, in a case where a relationship of the stroke L1 with a stroke L3 set in advance is L1<L3, control to change to a fretting operation mode. For example, the stroke L1 is set to 5 mm, and the stroke L3 is set to 15 mm. The control apparatus 200 may perform L3–L1 to calculate the stroke L2, and in a case where L1<L2, the control apparatus 200 may perform changing to the fretting operation mode.

Position B in FIG. 5 is a diagram illustrating a position (retreat completion position) where the plunger pressing member 9 has retreated by the fretting operation. The stroke L3 from the injection completion position to the retreat completion position is set in advance, and when the fretting operation mode is set, the fretting operation is performed. In this operation, since the plunger pressing member 9 and the injection plunger 4 are separated from each other, only the plunger pressing member 9 moves by the stroke L2. The position of the end 9a of the plunger pressing member 9 in Position B is referred to as the "third position".

Position C in FIG. 5 is a diagram illustrating a position where the plunger pressing member 9 has been moved forward from the retreat completion position and the movement to the metering start position has been completed. In this position, the plunger pressing member 9 and the injection plunger 4 are separated from each other. The position of the end 9a of the plunger pressing member 9 in Position C is referred to as the "fifth position". Then, the injection plunger 4 is moved back by the pressure of the molten resin flowing into the injection cylinder 3, and the injection plunger 4 comes into contact with and abuts against the plunger pressing member 9.

Position D in FIG. 5 is a diagram illustrating a position where the injection plunger 4 and the plunger pressing member 9 have been brought into contact with each other, and metering of the molten resin has been completed. The position of the end 9a of the plunger pressing member 9 in Position D is referred to as the "first position". The completion of the metering is determined by detection of a state in which the injection plunger 4 has pressed the plunger pressing member 9 by the pressure of the molten resin stored in the injection cylinder 3, based on a current value of a servo motor or the like. Then, the rotation of the plasticizing screw 6 in FIG. 4 is stopped to complete the metering operation. Also, a different sensor or the like may be used as detection means for determining completion of the metering.

The fitting clearance between the injection plunger 4 and the injection cylinder 3 may be set to 2 μm to 50 μm, for example. In some cases in a continuous forming operation, the sliding resistance between the injection plunger 4 and the injection cylinder 3 changes when the injection plunger 4 is pushed up and moved back by the molten resin that has flowed into the clearance. In the present exemplary embodiment, a time T is detected. The time T is a time period from a timing at which the plunger pressing member 9 is in the metering start position illustrated in Position C and rotation of the plasticizing screw 6 is started until a timing at which the plunger pressing member 9 is in the metering completion position illustrated in Position D and detection of the injection plunger 4 pressing the plunger pressing member 9 is performed. The control apparatus 200 compares the time T with a predetermined time set in advance. In a case where the time T exceeds the predetermined time, the control apparatus 200 determines that the molten resin has flowed into the fitting clearance between the injection plunger 4 and the injection cylinder 3, that is, galling occurs. By this determination, the control apparatus 200 is able to issue a warning to prompt maintenance. The predetermined time is one second, for example.

As described above, even in a case where the molten resin is let to flow into the injection cylinder 3 in a state where the injection plunger 4 has been moved back to the metering completion position, it is not necessary to stop the injection apparatus for grease circulation of the ball screw. That is, the injection apparatus is able to be moved with a stroke with which fretting wear is able to be reduced, in the interval of the continuous forming performed with minute strokes. Since the injection plunger 4 is not forcibly moved back, occurrence of defective molding due to air entrainment is able to be reduced, whereby the yield related to the molded article manufacturing is improved. Position E is a diagram illustrating a position where a "suck back operation" has been performed in the same way as illustrated in Position E in FIG. 3. Position F in FIG. 5 is a diagram illustrating the injection completion position in the same way as illustrated in Position F in FIG. 3.

The injection apparatus according to the third exemplary embodiment will be described with reference to FIG. 6. In the third exemplary embodiment, descriptions of the same matters as those in the first exemplary embodiment and the second exemplary embodiment will be simplified or omitted.

Figure 6:
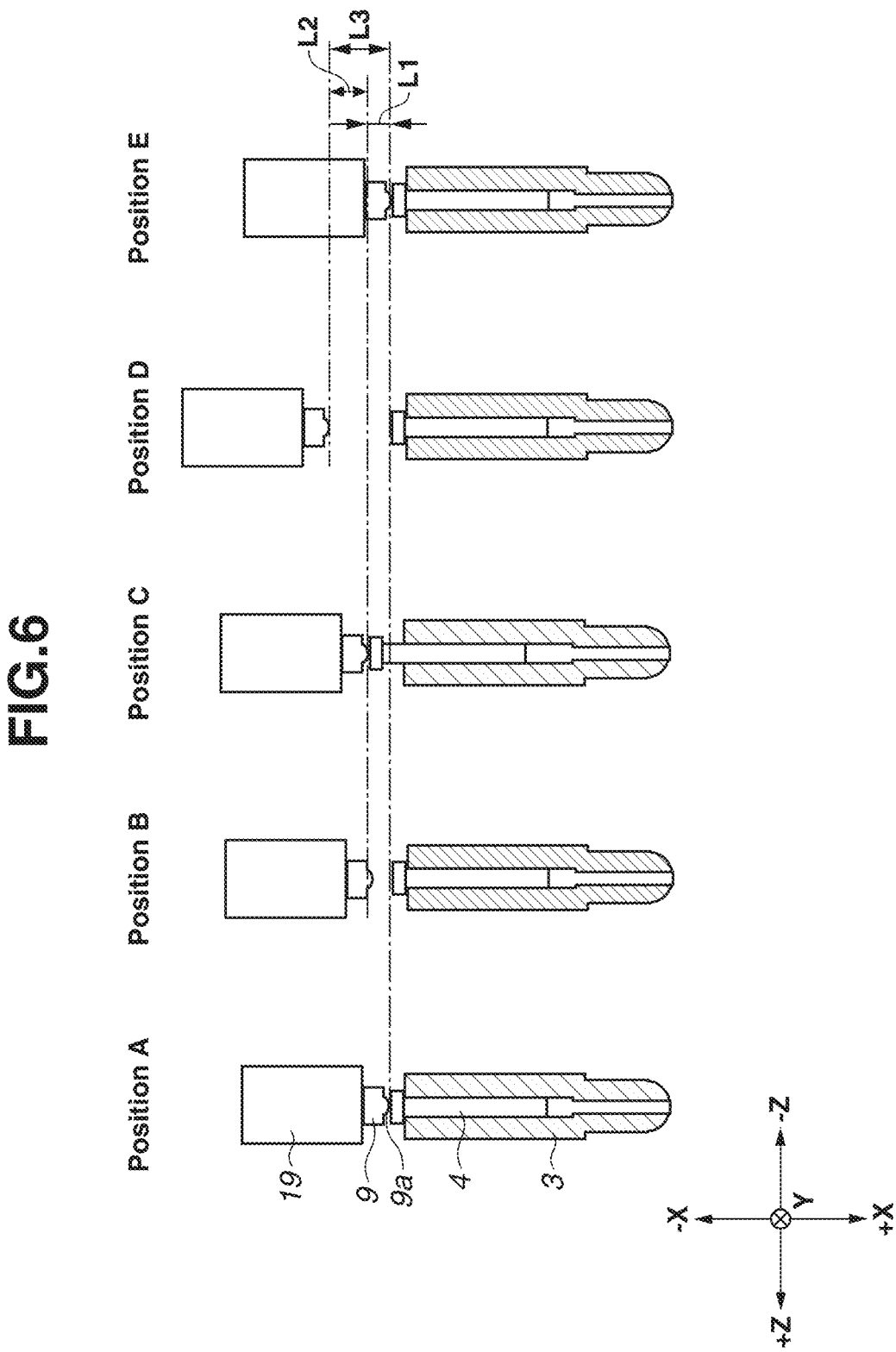
FIG. 6 includes diagrams illustrating a molded article manufacturing method using an injection apparatus according to a third exemplary embodiment.

In FIG. 6, Positions A to E are cross sectional diagrams schematically illustrating the injection cylinder 3, the injection plunger 4, and the plunger pressing member 9 according to the third exemplary embodiment. The positional relationships between the injection plunger 4 and the plunger pressing member 9 with respect to the injection cylinder 3 are illustrated in time series from Positions A to D, and the movements illustrated in Positions A to D are repeated in this order in the forming process.

Position A is a diagram illustrating a position where the injection plunger 4 has moved forward in the +X direction, and injection of the molten resin stored in the injection cylinder 3 has been completed. The position of the end 9a of the plunger pressing member 9 in Position A is referred to as the "second position".

In this state, the molten resin remaining in the flow path after completion of injection is in a high pressure state due to the residual pressure after the injection. As shown in FIG. 4, when the injection is completed, the check valve 8 is in a closed state to prevent the molten resin from flowing back toward the plasticizing screw 6 during the injection. Then, the check valve 8 is opened as shown in FIG. 1. The check valve 8 is configured to be opened and closed by air driving. When the flow path is opened, the pressure of the molten resin remaining in the flow path in a state where the residual pressure remains is released. Further, after opening of the check valve 8, the plasticizing screw 6 is rotated in a direction opposite to a direction for plasticizing and melting.

Position B in FIG. 6 is a diagram illustrating a position where the plunger pressing member 9 has retreated in the –X direction from the second position and the movement of the plunger pressing member 9 to the metering start position has been completed. The position of the end 9a of the plunger pressing member 9 in Position B is referred to as the "fifth position". In this state, the plunger pressing member 9 and the injection plunger 4 are separated from each other. Then, the injection plunger 4 is moved back by the pressure of the molten resin that has flowed into the injection cylinder 3, and the injection plunger 4 comes into contact with and abuts against the plunger pressing member 9.

Position C in FIG. 6 is a diagram illustrating a position where the injection plunger 4 and the plunger pressing member 9 have been brought into contact with each other, and metering of the molten resin has been completed. The position of the end 9a of the plunger pressing member 9 in Position C is referred to as the "first position". The completion of the metering is determined by detection of a state in which the injection plunger 4 has pressed the plunger pressing member 9 by the pressure of the molten resin stored in the injection cylinder 3, based on a current value of the servo motor or the like. Then, rotation of the plasticizing screw 6 in FIG. 4 is stopped to end the metering operation. A different sensor or the like may be used as detection means for determining completion of the metering.

Position D in FIG. 6 is a diagram illustrating a position where the fretting operation has been performed and where the plunger pressing member 9 has retreated. The stroke L3 from the injection completion position to the retreat completion position is set in advance, and the retreating operation is performed in the fretting operation mode. In this operation, since the plunger pressing member 9 and the injection plunger 4 are separated from each other, only the plunger pressing member 9 moves by the stroke L2. The position of the end 9a of the plunger pressing member 9 in Position D is referred to as the "third position". Position E is a diagram illustrating the injection completion position in which the injection plunger 4 has been pressed by the plunger pressing member 9 and moved forward in the +X direction from the state illustrated in Position D, and injection of the molten resin stored in the injection cylinder 3 has been completed. In this state, the plunger pressing member 9 and the injection plunger 4 are in contact with each other.

The suck back operation may be performed during the movement of the plunger pressing member 9 from the metering completion position illustrated in Position C to the retreat completion position illustrated in Position D, by causing plunger pressing member 9 to perform the movement via the suck back position.

Figure 7:
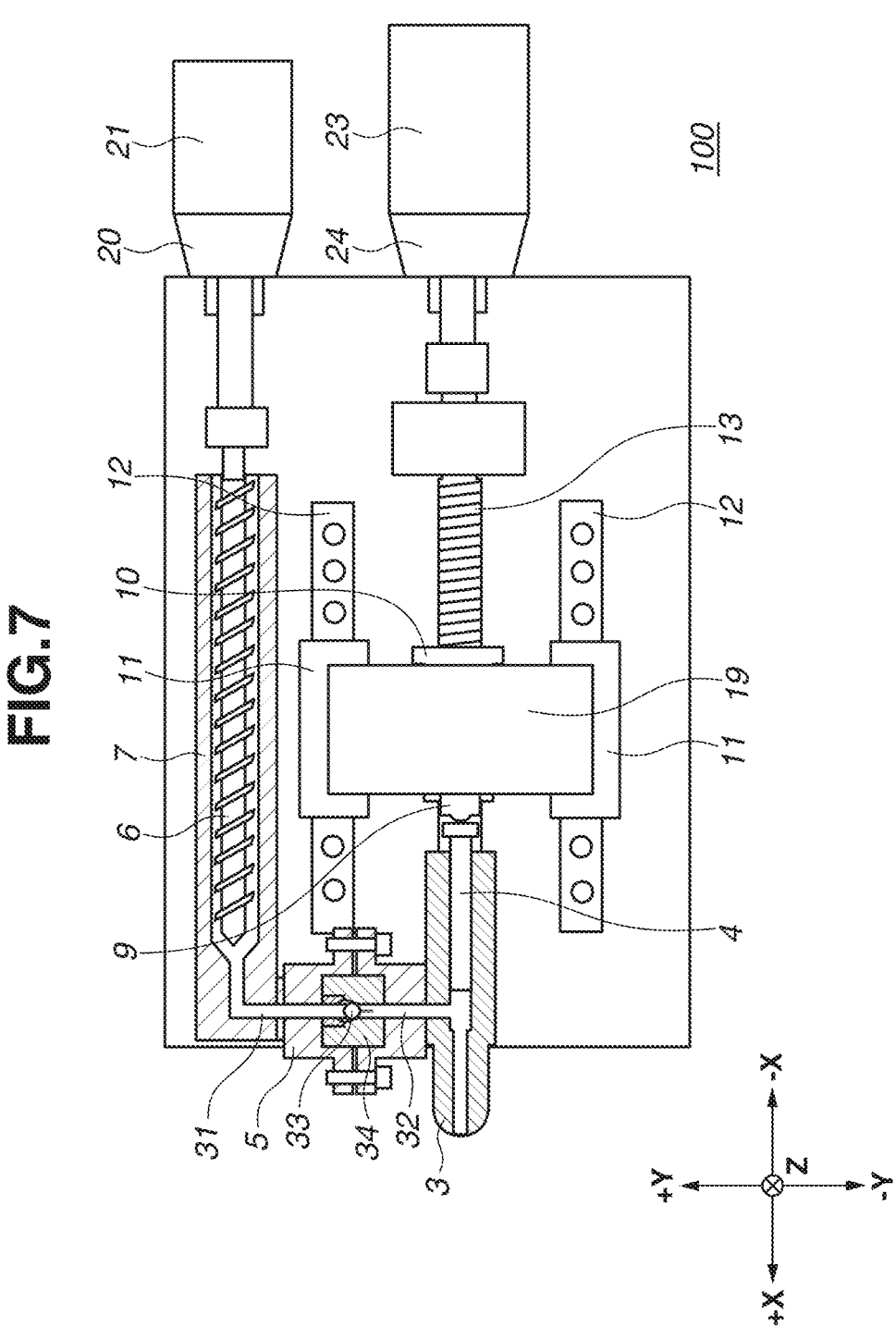
FIG. 7 is a diagram illustrating a molded article manufacturing method using an injection apparatus according to a fourth exemplary embodiment.

The injection apparatus according to the fourth exemplary embodiment will be described with reference to FIG. 5, FIG. 7, and FIGS. 9A and 9B. FIG. 7 is a cross sectional view illustrating a resin flow path of a preplasticating injection molding machine equipped with the injection plunger 4 according to the present exemplary embodiment.

Figure 8A:
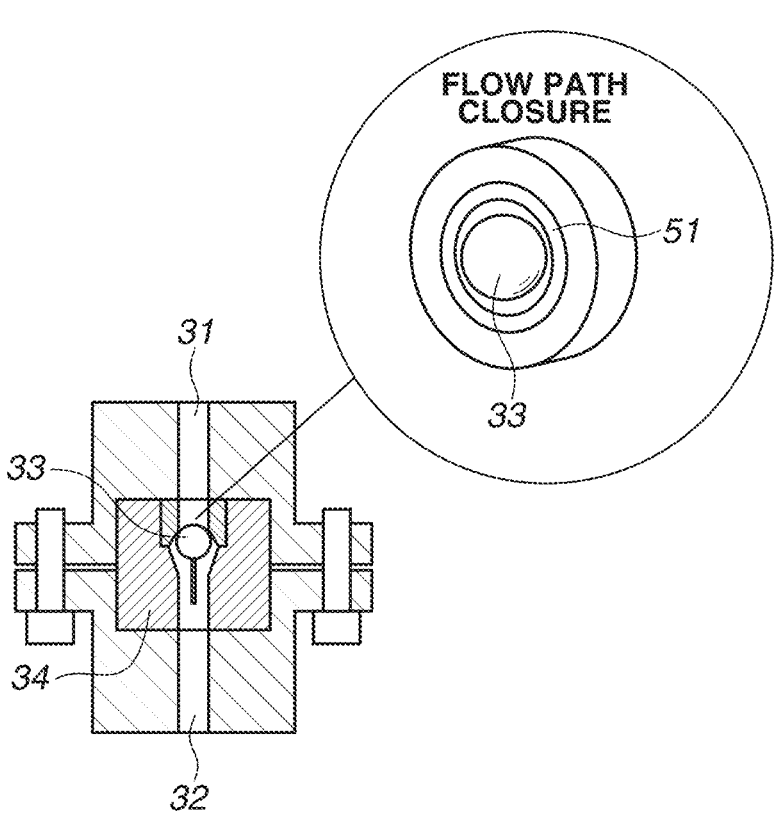
FIGS. 8A and 8B are schematic cross sectional views illustrating a valve unit according to the fourth exemplary embodiment.
Figure 8B:
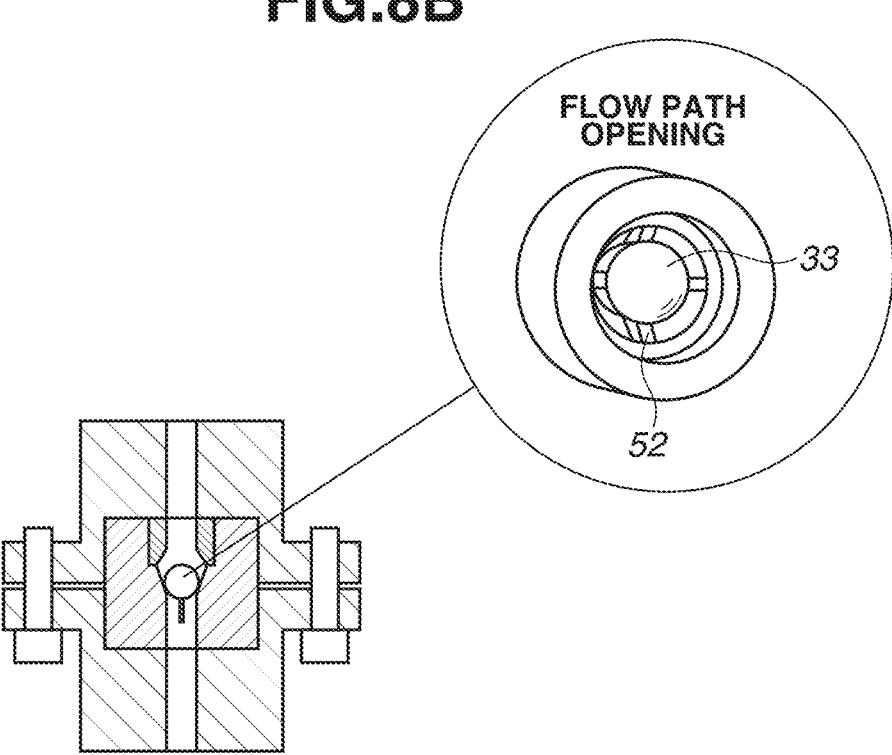
Figure 9A:
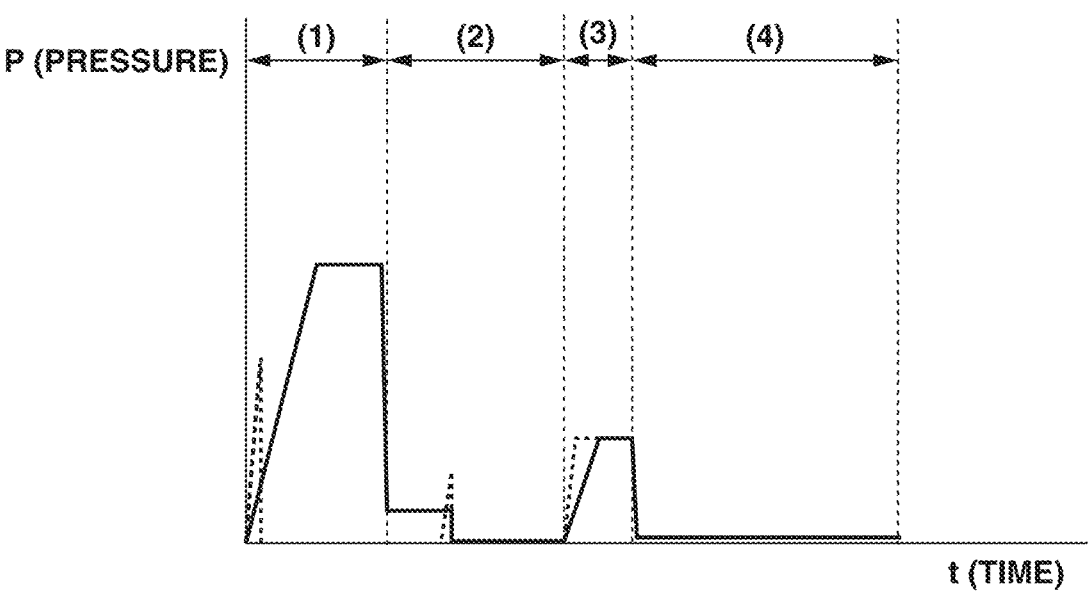
FIGS. 9A and 9B are schematic graphs of a resin pressure in a resin flow path on a side with an injection plunger and a resin pressure in a resin flow path on a side with a plasticizing screw in an injection molding cycle according to the fourth exemplary embodiment and a fifth exemplary embodiment.

FIGS. 8A and 8B are cross sectional views illustrating a valve unit using a ball in the present exemplary embodiment. FIG. 9A is a schematic graph of a pressure in the resin flow path on a side with the injection plunger 4 and a pressure in the resin flow path on a side with the plasticizing screw 6 in an injection molding cycle in the present exemplary embodiment.

A description will be given of an operation of opening and closing of the resin flow path that is performed by opening and closing of a check valve with a resin flow, and performing continuous molding with minute strokes. As shown in FIG. 7 and FIGS. 8A and 8B, a ball 33 is disposed in a valve unit 34 inserted in the resin flow path inside the coupling member 5 connecting the injection plunger 4 and the plasticizing screw 6. When the ball 33 moves to a side with the plasticizing screw 6, the resin flow path between the flow path 31 on the side with the plasticizing screw 6 and the flow path 32 on the side with the injection plunger 4 is closed by the ball 33 being on a valve seat 51. When the ball 33 moves toward a side with the injection plunger 4, the ball 33 comes into contact with a valve claw 52. In this state, because of a gap between the ball 33 and the valve claw 52, which are in contact with each other, the resin flow path is opened. For example, the diameter of a basic flow path of the coupling member 5 is 5 mm, the diameter of the ball 33 is 6 mm, and the diameter of the valve unit 34 are gradually increased to hold the ball 33 inside the valve unit 34.

Position A in FIG. 5 is a diagram illustrating a position where the injection plunger 4 has been moved forward and injection of the molten resin stored in the injection cylinder 3 has been completed. FIG. 9A is a schematic graph illustrating the resin pressure in an injection molding cycle. In the graph, a solid line indicates the resin pressure in the resin flow path on the side with injection plunger 4, and a dotted line indicates the resin pressure in the resin flow path on the side with the plasticizing screw 6. A period (1) in FIG. 9A schematically indicates the resin pressure in the process in which the injection plunger 4 is moved forward and the movement of the injection plunger 4 to the injection completion position is completed. In this process, by injection of the molten resin, the molten resin flows into the flow path 31 on the side with the plasticizing screw 6 from the flow path 32 on the side with the injection plunger 4. As a result of the molten resin inflow, the ball 33 moves toward the side with the plasticizing screw 6 in the coupling member 5 as illustrated in FIG. 8A, and the resin flow path is closed with the ball 33 being on the valve seat 51. In this state, as illustrated in Position A in FIG. 5 and the period (1) in FIG. 9A, the pressure in the flow path 32 on the side with the injection plunger 4 is increased by injection of the molten resin, and the pressure in the flow path 31 on the side with the plasticizing screw 6 is also increased by inflow of the molten resin, which leads to closing of the resin flow path and dispersing of the pressures, whereby the pressures are decreased. The molten resin in the flow path 32 on the side with the injection plunger 4 remains in a high pressure state due to the residual pressure after the injection. The present exemplary embodiment uses, as an example, a case of elastomer molding which does not require a holding pressure process, and thus, the residual pressure is equal to or less than 10 MPa, and the pressure difference between the pressure in the flow path 31 on the side with the plasticizing screw 6 and the pressure in the flow path 32 on the side with the injection plunger 4 is not large. Next, as illustrated in a period (2) in FIG. 9A, the resin flow path is opened to depressurize the molten resin in the flow path 32. In order to perform this operation, the plasticizing screw 6 is rotated in the plasticizing and melting direction. After gradual increase in the pressure in the flow path 31 on the side with the plasticizing screw 6, and when the pressure in the flow path 31 exceeds the pressure of the molten resin in the flow path 32 on the side with the injection plunger 4, the ball 33 moves in the coupling member 5 toward the side with the injection plunger 4 and comes into contact with the valve claw 52 as illustrated in FIG. 8B, whereby the resin flow path is opened through the gap between the ball 33 and the valve claw 52. In this state, due to inflow of the plasticized molten resin, the molten resin flows from the flow path 32 on the side with the injection plunger 4 into the flow path 31 on the side with the plasticizing screw 6, and the pressures are equalized. In this state, since the pressure difference is not large, the ball 33 does not close the resin flow path. Further, the plasticizing screw 6 is rotated in a direction opposite to the plasticizing and melting direction. By this operation, depressurization of the flow path 32 on the side with the injection plunger 4 and the flow path 31 on the side with the plasticizing screw 6 is performed, and the depressurization is completed.

Then, as illustrated in Position B in FIG. 5, only the plunger pressing member 9 is retreated by the stroke L3. In the case of elastomer molding which does not require a holding pressure, there may be a case where almost no residual pressure remains as illustrated in the period (2) in FIG. 9A. In this case, the depressurization and the retreating of the plunger pressing member 9 may be performed at the same time. Next, the plunger pressing member 9 is moved forward from the retreat completion position to a position immediately before the injection completion position, as illustrated in Position C in FIG. 5. Further, as illustrated in Position D in FIG. 5 and a period (3) in FIG. 9A, the resin plasticized and melted by rotation of the plasticizing screw 6 flows into the injection cylinder 3 through the resin flow path in the coupling member 5 and is stored in the injection cylinder 3. In this operation, in the coupling member 5, the ball 33 is in contact with the valve claw 52 as shown in FIG. 8B, and the resin flow path is opened. The plunger pressing member 9 retreats while pressing the injection plunger 4 to apply a back pressure to the molten resin stored in the injection cylinder 3, from the injection completion position to the metering completion position by the stroke L1.

In the above described way, even in the configuration in which the check valve is opened and closed by resin flow, the metering completion position, the retreat completion position, and the injection completion position are able to be set, whereby the same effects as those of the above described exemplary embodiments are obtained.

Figure 9B:
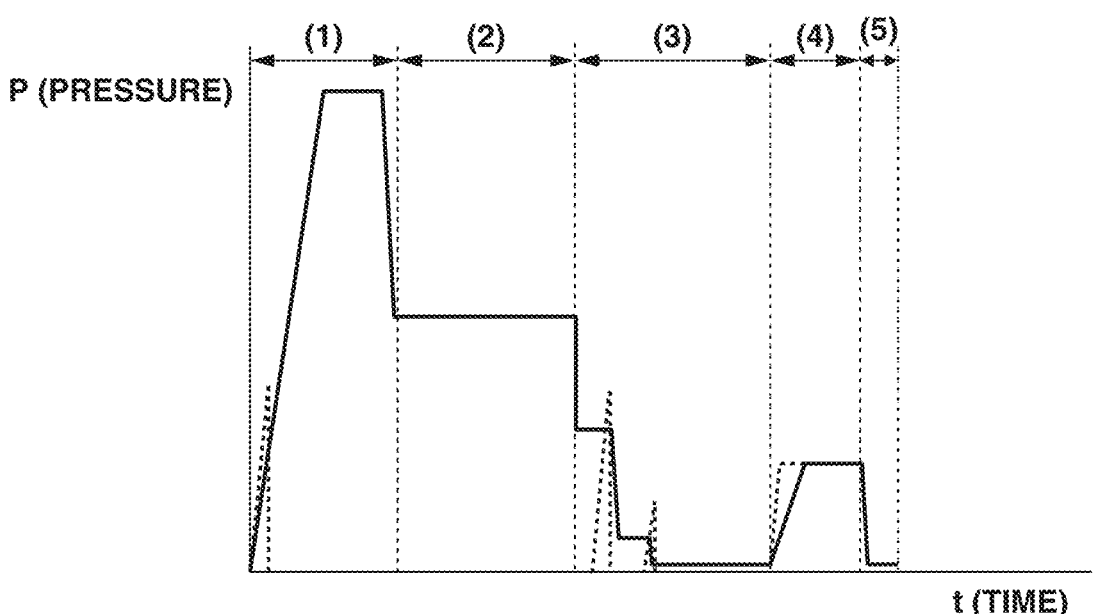

As a fifth exemplary embodiment, as shown in FIG. 9B, even in a case where pressure control is performed under a high pressure condition, a position where the pressure control has been completed is set as the injection completion position, and the residual pressure of the molten resin in the flow path 32 on the side with the injection plunger 4 is much higher, the depressurization is able to be performed by rotation and reverse rotation of the plasticizing screw 6 a plurality of times in the depressurization. When the residual pressure is high, the above described reverse rotation of the plasticizing screw 6 is performed to depressurize the flow path 32 on the side with the injection plunger 4 and the flow path 31 on the side with the plasticizing screw 6. However, the ball 33 moves from a flow path opening position illustrated in FIG. 8B to a flow path closing position illustrated in FIG. 8A. In this case, the plasticizing screw 6 is further rotated and reversely rotated to gradually release the pressure in the resin flow path. With such an operation, the same effects as those of the above described exemplary embodiments are obtained.

[Display Means]

Figure 10:
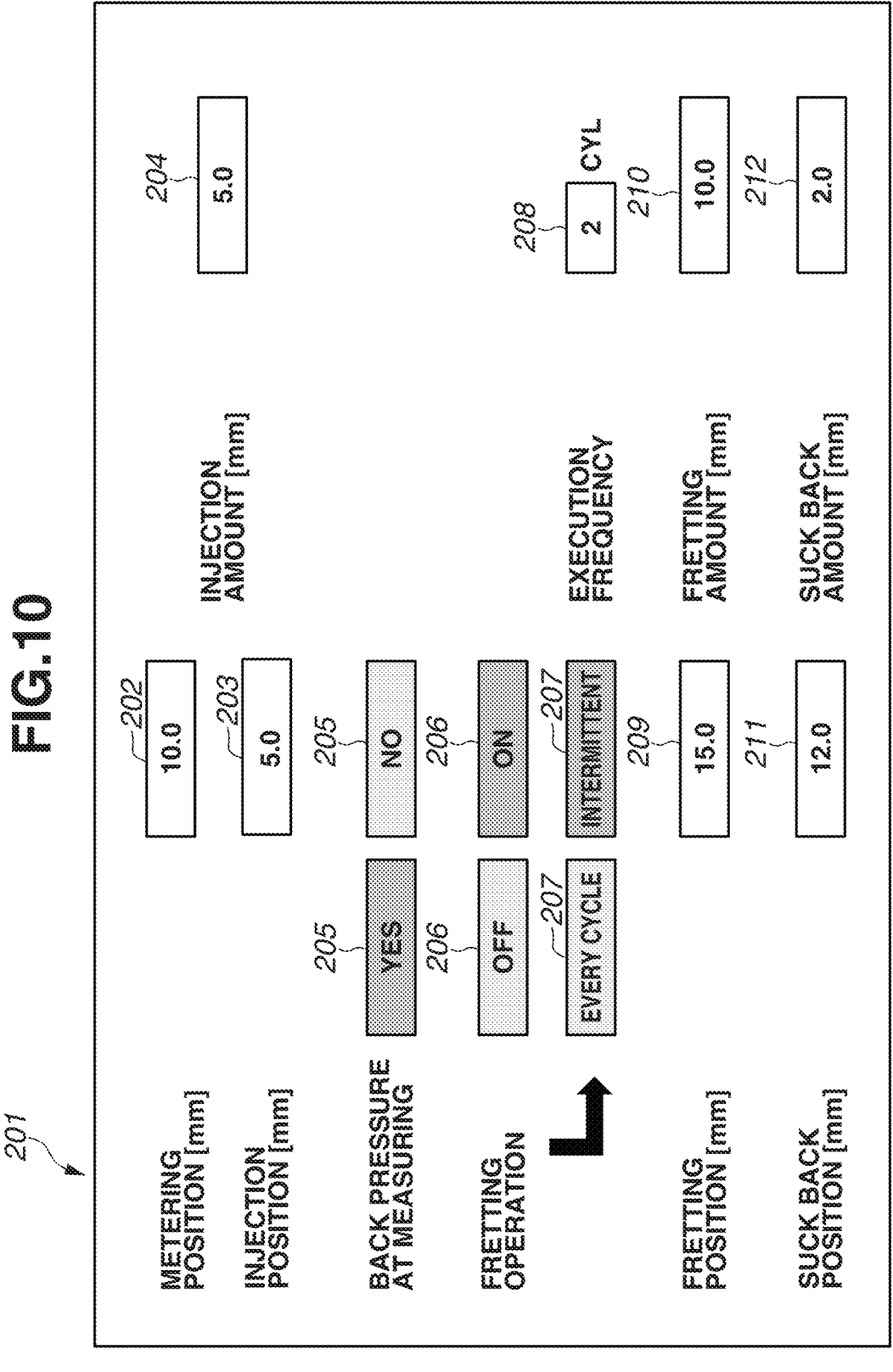
FIG. 10 is a diagram illustrating a display unit according to the first exemplary embodiment.

Next, a display unit 201 of the control apparatus 200 will be described with reference to FIG. 10. The control apparatus 200 causes the display unit 201, such as a monitor or a touch screen, to display position information on the metering completion position, the injection completion position, and the retreat completion position of the moving member 14 in the screw shaft 13. The display unit 201 may be a device different from the control apparatus 200 or may be a part of the control apparatus 200.

The position information is, for example, a length from the end of the screw shaft 13 to the end 9a in each state when the moving member 14 is in the metering completion position, the injection completion position, and the retreat completion position. The display unit 201 may further have a function of displaying a relative positional relationship information, such as a movement distance from the metering completion position to the injection completion position and a movement distance from the injection completion position to the retreat completion position.

The display unit 201 is able to receive an input from a user. In a metering position input field 202, the metering completion position is able to be input and displayed. In an injection position input field 203, an injection completion position is able to be input and displayed. In an injection amount input field 204, an injection amount is able to be input and displayed.

The control apparatus 200 compares a predetermined value with the position information or the relative positional relationship information input by the user, or position information or relative positional relationship information calculated by the control apparatus 200 from the position information and the relative positional relationship information input by the user. For example, the control apparatus 200 calculates a numerical value of the injection amount input field 204 from position information input to the metering position input field 202 and the injection position input field 203, and performs a comparison by determining whether the numerical value is smaller than a distance necessary for circulating the grease around the ball 33 in the ball screw 15. In a case where the control apparatus 200 determines that the numerical value of the injection amount input field 204 is smaller than the distance necessary for the grease circulation, the control apparatus 200 causes the display unit 201 to display a warning or a notification that changing to a mode in which the fretting operation is to be performed in an interval between the continuous injection operations is available.

The user uses back pressure-at-metering YES/NO buttons 205 to select whether a back pressure is to be applied at the time of metering. In a case where the user selects "YES", control to cause the molten resin to flow into the injection cylinder 3 is performed under a state in which a predetermined back pressure is applied to the molten resin by the plunger pressing member 9 pressing the injection plunger 4 in the +X direction.

Fretting operation ON/OFF buttons 206 are used to change whether the fretting operation is to be performed in the interval between continuous injection operations. Fretting operation execution frequency selection buttons 207 are used to select whether the fretting operation is to be performed for each cycle of the injection operation or intermittently. An execution frequency input field 208 is used to specify the number of injection operation cycles, at intervals of which the fretting operation is to be performed.

In a fretting position input field 209, the retreat completion position is able to be inputted and displayed. In a fretting amount input filed 210, the length of the stroke L2 is able to be input and displayed.

In a suck back position input field 211, the suck back position is able to be inputted and displayed. In a suck back amount input filed 212, the distance of the stroke L4 is able to be input and displayed.

The control apparatus 200 may automatically perform changing to the mode in which the fretting operation is to be performed even when there is no operation by the user. The control apparatus 200 may automatically change the position information and the relative positional relationship information on the moving member 14 such that the movement distance from the injection completion position to the retreat completion position is larger than the movement distance from the metering completion position to the injection completion position.

According to the present disclosure, even in a case where the injection operation is repeated with minute strokes, occurrence of damages in the injection apparatus is reduced.

The present disclosure is not limited to the exemplary embodiments described above, and many modifications can be made within the technical idea of the present disclosure. In addition, the effects described in the exemplary embodiments are merely a list of some of the effects produced from the present disclosure, and the effects of the present disclosure are not limited to those described in the exemplary embodiments.

In the above-described various exemplary embodiments, the end 9a of the plunger pressing member 9 has been described as a part of the moving member 14. However, the configuration is not limited to this. Instead of the end 9a, a rear end of plunger pressing member 9, a part of the ball screw nut 10, or a predetermined part set in advance can be used. That is, any part can be used as long as distances in various positions of the same part are able to be compared in the moving member 14.

In the above described various exemplary embodiments, the moving member 14 is moved backward in the –X direction in the fretting operation, but may be moved forward in the +X direction.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-189346, which was filed Nov. 28, 2022 and which is hereby incorporated by reference herein in its entirety.

What is claimed is:

1. A control method of a manufacturing apparatus that includes an injection nozzle configured to inject resin, an injection cylinder configured to store resin to be supplied to the injection nozzle, an injection plunger configured to press the resin stored in the injection cylinder, and a movable unit configured to move the injection plunger, wherein the movable unit has a ball screw that includes a moving member and a screw shaft, the moving member being configured to move in a direction in which the injection plunger moves, the screw shaft being configured to rotate to move the moving member, wherein the moving member is movable to at least a first position, a second position, and a third position in a direction along the screw shaft, the control method comprising:

performing, by the moving of the moving member, a first injection operation, a second injection operation that is performed after the first injection operation, and a third injection operation that is performed after the second injection operation, wherein the first position is a position of the moving member when an amount of resin to be injected in the second injection operation is stored in the injection cylinder, wherein the second position is a position of the moving member when injection of the resin from the injection cylinder is completed in the second injection operation, wherein the third position is a position where a first distance from a position of a part of the moving member in the second position to a position of the part of the moving member in the third position is larger than a second distance from a position of the part of the moving member in the first position to the position of the part of the moving member in the second position, wherein the moving member is moved to the third position in an interval between the first injection operation and the third injection operation, wherein the moving member is a member capable of separating from the injection plunger, wherein the moving member is further configured to move to a fifth position, wherein the fifth position is between the first position and the second position in the direction in which the injection plunger moves, and wherein, when the resin is supplied to the injection cylinder in a state where the moving member is separated from the injection plunger, the injection plunger pushed by the resin comes into contact with the moving member and moves the moving member from the fifth position to the first position.

2. The control method according to claim 1, wherein when the moving member is in the third position, the moving member and the injection plunger are separated from each other.

3. The control method according to claim 1, wherein the moving member is moved to the third position while being moved from the first position to the second position.

4. The control method according to claim 1, wherein the moving member is moved to the third position while being moved from the second position to the first position.

5. The control method according to claim 1, wherein the first distance is larger than a product of a lead and a number of turns of the ball screw.

6. The control method according to claim 1, wherein the first distance is smaller than a diameter of the ball screw.

7. The control method according to claim 1, wherein the moving member is further configured to move to a fourth position, wherein the fourth position is on a side opposite to the injection nozzle with respect to the first position in the direction in which the injection plunger moves, and wherein the moving member is moved to the fourth position after the amount of resin to be injected is stored in the injection cylinder in the first position.

8. The control method according to claim 7, wherein a third distance from the first position to the fourth position is smaller than the first distance.

9. The control method according to claim 8, wherein the third distance is smaller than the second distance.

10. The control method according to claim 1, wherein the moving member is further configured to move to a fourth position, wherein the fourth position is on a side opposite to the injection nozzle with respect to the first position in the direction in which the injection plunger moves, and wherein the moving member is moved to the fourth position after being moved from the third position to the first position.

11. The control method according to claim 1, wherein the moving member is further configured to move to a fourth position, wherein the fourth position is on a side opposite to the injection nozzle with respect to the first position in the direction in which the injection plunger moves, and wherein the moving member moves via the fourth position while moving from the first position to the third position.

12. The control method according to claim 1, wherein the moving member is separated from the injection plunger while moving from the first position to the third position.

13. The control method according to claim 1, wherein in a case where the second distance is smaller than a distance required for grease to circulate around a ball of the ball screw, control is performed to perform changing to a mode in which the moving member is to move to the third position in an interval between continuous injection operations.

14. A manufacturing system comprising:
a manufacturing apparatus; and
a control apparatus capable of controlling the manufacturing apparatus,
wherein the manufacturing apparatus includes
an injection nozzle configured to inject resin,
an injection cylinder configured to store resin to be supplied to the injection nozzle,
an injection plunger configured to press the resin stored in the injection cylinder, and
a movable unit configured to move the injection plunger,
wherein the movable unit has a ball screw including a moving member configured to move in a direction in which the injection plunger moves, and a screw shaft configured to rotate to move the moving member,
wherein the moving member is movable to at least a first position, a second position, and a third position in a direction along the screw shaft,
wherein, by moving of the moving member, a first injection operation, a second injection operation that is performed after the first injection operation, and a third injection operation that is performed after the second injection operation are performed,
wherein the first position is a position of the moving member when an amount of resin to be injected in the second injection operation is stored in the injection cylinder,
wherein the second position is a position of the moving member when injection of the resin from the injection cylinder is completed in the second injection operation,
wherein the third position is a position where a distance from a position of a part of the moving member in the second position to a position of the part of the moving member in the third position is larger than a distance from a position of the part of the moving member in the first position to the position of the part of the moving member in the second position,
wherein the control apparatus moves the moving member to the third position in an interval between the first injection operation and the third injection operation,
wherein the moving member is a member capable of separating from the injection plunger,
wherein the moving member is further configured to move to a fifth position,
wherein the fifth position is between the first position and the second position in the direction in which the injection plunger moves, and
wherein, when the resin is supplied to the injection cylinder in a state where the moving member is separated from the injection plunger, the injection plunger pushed by the resin comes into contact with the moving member and moves the moving member from the fifth position to the first position.

15. The manufacturing system according to claim 14, wherein the resin flows into the injection cylinder through a connection member including a valve unit, and wherein the valve unit is configured to depressurize an inside of the injection cylinder.

16. A control apparatus that controls a manufacturing apparatus that includes
an injection nozzle configured to inject resin,
an injection cylinder configured to store resin to be supplied to the injection nozzle,
an injection plunger configured to press the resin stored in the injection cylinder, and
a movable unit configured to move the injection plunger,
wherein the movable unit has a ball screw that includes a moving member and a screw shaft, the moving member being configured to move in a direction in which the injection plunger moves, the screw shaft being configured to rotate to move the moving member,
wherein the moving member is movable to at least a first position, a second position, and a third position in a direction along the screw shaft, the control apparatus comprising:
one or more processors configured to cause the control apparatus to:
perform, by the moving of the moving member, a first injection operation, a second injection operation that is performed after the first injection operation, and a third injection operation that is performed after the second injection operation,
wherein the first position is a position of the moving member when an amount of the resin to be injected in the second injection operation is stored in the injection cylinder,
wherein the second position is a position of the moving member when injection of the resin from the injection cylinder is completed in the second injection operation,
wherein the third position is a position where a distance from the second position to the third position is larger than a distance from the first position to the second position, and
wherein the moving member is moved to the third position in an interval between the first injection operation and the third injection operation,
wherein the moving member is a member capable of separating from the injection plunger,
wherein the moving member is further configured to move to a fifth position,
wherein the fifth position is between the first position and the second position in a direction in which the injection plunger moves, and
wherein, when the resin is supplied to the injection cylinder in a state where the moving member is separated from the injection plunger, the injection plunger pushed by the resin comes into contact with the moving member and moves the moving member from the fifth position to the first position.

17. The control apparatus according to claim 16, wherein the one or more processors are further configured to cause the control apparatus to display at least one of position information on the first position, position information on the second position, and position information on the third position on a display device.

18. The control apparatus according to claim 16, wherein the one or more processors are further configured to cause the control apparatus to display a relative positional relationship of at least one combination of the first position, the second position, and the third position on a display device.

19. The control apparatus according to claim 16, wherein the one or more processors are further configured to cause the control apparatus to display a notification that changing between a mode in which the moving member is to be moved to the third position in an interval between continuous injection operations and a mode in which the moving member is not to be moved to the third position is available on a display device.

20. The control apparatus according to claim 16, wherein the one or more processors are further configured to cause the control apparatus to display a button for changing between a mode in which the moving member is to be moved to the third position in an interval between continuous injection operations and a mode in which the moving member is not to be moved to the third position on a display device.

21. A method for manufacturing a molded article, the method comprising:

controlling a manufacturing apparatus for manufacturing the molded article by using the control method according to claim 1; and injecting the resin from the injection nozzle into a mold.

22. A method for manufacturing a molded article, the method comprising injecting, by using the manufacturing system according to claim 14, the resin from the injection nozzle into a mold.

23. A method for manufacturing a molded article, the method comprising injecting, by using the control apparatus according to claim 16, the resin from the injection nozzle into a mold.

\* \* \* \* \*